US006467609B1

(12) United States Patent
Williams et al.

(10) Patent No.: US 6,467,609 B1
(45) Date of Patent: Oct. 22, 2002

(54) CAN TRANSFER ROTATING PLATE SYSTEM

(75) Inventors: Robert Williams, Randolph, NJ (US); Russell Di Donato, Maplewood, NJ (US)

(73) Assignee: Sequa Can Machinery, Inc., East Rutherford, NJ (US)

( * ) Notice: Subject to any disclaimer, the term of this patent is extended or adjusted under 35 U.S.C. 154(b) by 0 days.

(21) Appl. No.: 09/564,214

(22) Filed: May 4, 2000

Related U.S. Application Data

(63) Continuation-in-part of application No. 09/306,942, filed on May 7, 1999, now abandoned.

(51) Int. Cl.[7] ................................................ B65G 47/84

(52) U.S. Cl. ................ 198/471.1; 198/441; 198/803.5; 198/370.12

(58) Field of Search ............................ 198/441, 471.1, 198/803.5, 370.12

(56) References Cited

U.S. PATENT DOCUMENTS

| | | | | |
|---|---|---|---|---|
| 4,391,372 A | * | 7/1983 | Calhoun ............ | 198/370.12 X |
| 4,445,431 A | | 5/1984 | Stirbis | |
| 4,771,879 A | | 9/1988 | Shriver | |
| 5,183,145 A | | 2/1993 | Williams et al. | |
| 5,231,926 A | * | 8/1993 | Williams et al. ........ | 198/441 X |
| 5,749,631 A | | 5/1998 | Williams | |

* cited by examiner

*Primary Examiner*—Steven A. Bratlie
(74) *Attorney, Agent, or Firm*—Mitchell D. Bittman; Lawrence A. Hoffman

(57) ABSTRACT

The output end of a very high speed continuous motion cylindrical can decorator is provided with unloading apparatus in the form of a continuously moving closed loop suction belt supplied by first and second continuously rotating, parallel axis, suction applying conveyor wheels. Cans held on the second wheel are on two concentric circular tracks and are transferred by suction to the belt. The first wheel carries cans along a single row circular path. In a region where the first and second wheels overlap partially, alternate cans on the path are delivered to one track of the second wheel and the remaining alternate cans on the path are delivered to the other track of the second wheel. Alternate cans supported on the first wheel may be moved radially so that the cans on the first wheel are in two rows which intersect the two tracks on the second wheel at respective common tangents of each row and the respective track.

32 Claims, 11 Drawing Sheets

CAN TRANSFER ROTATING PLATE SYSTEM

CROSS REFERENCE TO RELATED APPLICATION

This is a continuation in part of application Ser. No. 09/306,942, filed May 7, 1999 now abandoned.

BACKGROUND OF THE INVENTION

The present invention relates generally to continuous motion apparatus for decorating cylindrical containers, and relates more particularly to simplified apparatus of this type that does not require a deco chain for conveying decorated containers to a curing oven. It more specifically improves the transfer system between the can decorating and inking mandrel wheel and the curing oven for the decorated cans.

In high speed continuous motion equipment that decorates cylindrical containers (cans) for beverages and the like, decorated containers having wet decorations thereon were often off-loaded onto pins of a so-called deco chain that carries the containers through an ink curing and drying oven. Examples of this type of decorating equipment are disclosed in U.S. Pat. No. 5,183,145 which issued Feb. 2, 1993 to R. Williams et al., entitled Apparatus And Method For Automatically Positioning Valve Means Controlling The Application of Pressurized Air To Mandrels On a Rotating Carrier, and in U.S. Pat. No. 4,445,431 which issued May 1, 1984 to J. Stirbis entitled Disk Transfer System. Incorporated herein by reference are teachings of U.S. Pat. Nos. 5,183,145 and 4,445,431, as well as teachings of prior art patents referred to therein.

Over the years, production speeds of continuous motion can decorators have increased, now surpassing 1,800 cans/min., and it is desired to increase that speed still further. As speeds have increased, problems of unloading cans with wet decoraticins onto deco chain pins as well as problems with deco chains per se, have become more apparent and bothersome. These problems include excessive noise and can damage because of engagement between metal cans and metal pins. Not only are long deco chains expensive, but because they are constructed of so many parts there is a tendency for the chains to wear out and break down when operated at very high speeds.

Because of the foregoing problems, where feasible, decorated containers, especially those constructed of ferrous material are carried through curing ovens on belts rather than on the pins of a deco chain. Examples of such type of equipment using belts for carrying cans through curing ovens are found in U.S. Pat. No. 4,771,879 which issued Sep. 20, 1988 to F. L. Shriver for a Container Transfer System and in U.S. Pat. No. 5,749,631 which issued May 12, 1998 to R. Williams for a Dual Can Rotating Transfer Plate To Conveyor Plate. The teachings of U.S. Pat. Nos. 4,771,879 and 5,749,631, as well as teachings of prior art patents referred to therein, are also incorporated herein by reference.

In the can decorating apparatus of U.S. Pat. No. 4,771,879 cans are decorated, i.e., inked, on their surface while they are on mandrels that are mounted along the periphery of a mandrel wheel and the cans extend axially forward from the wheel. The decorated cans are transferred from the mandrels of the rotating mandrel wheel to a rotating wheel-like first transfer conveyor, are then further transferred from the first conveyor to the surface of a wheel-like second transfer conveyor and are thereafter transferred to a belt conveyor which carries the containers with still wet decorations thereon to and through a curing oven which cures the applied decorations. Cans conveyed by the second transfer conveyor project radially with respect to the rotational axis of the second transfer conveyor. While this arrangement avoids use of a deco chain, the second transfer conveyor of U.S. Pat. No. 4,771,879 is an expensive structure that is constructed of many parts, and there must be very close coordination between operation of the first and second transfer conveyors. Further, rotational axes for the two transfer conveyors are oriented transverse to one another resulting in inefficient utilization of space.

According to the invention disclosed in U.S. Pat. No. 5,749,631, cans with wet decorations thereon are transferred from the mandrel wheel to a first transfer conveyor wheel, then to a second transfer or takeaway conveyor wheel, and thereafter to a conveyor belt. The most obvious differences between U.S. Pat. Nos. 4,771,879 and 5,749,631 is that in the latter patent, the rotational axes of the transfer conveyors are oriented parallel to each other and are radially offset, and the second transfer conveyor has a simplified construction because cans conveyed by that conveyor project axially, parallel to the rotation axis of the second transfer conveyor. This is made possible by the second transfer conveyor including a rotating plate and a stationary suction manifold disposed behind the plate.

The manifold has an open side that is covered by a perforated portion of the plate that rotates past the open side of the manifold. The reduced pressure in the suction manifold generates suction at the perforations.

Cans travel in a single row around the mandrel wheel and are spaced relatively further apart to enable their decoration by the blankets of the blanket wheel. Hence, the decorated cans travel in a single row onto the first transfer conveyor from the mandrel wheel. The relatively larger spacing between cans on the mandrel wheel is not economical for space usage or for maximizing production in the curing oven. As the first transfer conveyor rotates past the mandrel wheel, the cans are rearranged into two rows on the first transfer conveyor. Rotating the first transfer conveyor slower than the mandrel wheel spaces the cans closer together on the first conveyor. Both of these expedients use space more economically. Then cans arranged in two rows on the first transfer conveyor are transferred to the rotating plate of the second transfer conveyor. Open ends of the cons engage a main planar surface of the plate at areas of the plate where perforations through the plate are arrayed over the suction manifold in two circular rows about the rotational axis of the plate as a center. The suction force at the plate perforations draws the cans rearward off the first conveyor toward the rotating plate of the second conveyor while the cans pass over the manifold. The influence of manifold suction on the cans is reduced when the closed ends of the cans rotate to and engage a vertical flight of a moving perforated belt conveyor, and the cans are thereafter held on the belt by suction forces at the perforations of the belt conveyor. The belt conveyor may carry the cans through a curing oven or transfer them to another conveyor that passes through the curing oven.

In order to rearrange the traveling cans carried by the rotating first transfer conveyor from a single row array as the cans are received by the first conveyor to a two row array as the cans are about to be delivered to the rotating plate of the second transfer conveyor, a somewhat complicated mechanism is provided on the first conveyor of the ’631 patent. The mechanism operates alternate ones of the cans that have been received by the first transfer conveyor to move radially inward toward the rotational axis of the first transfer conveyor before the cans reach the second conveyor.

Shifting cans radially on a rotating transfer conveyor, by using a cam for guiding the cans into two rows on the conveyor, is shown in U.S. Pat. No. 5,183,145. But this patent is not concerned with so positioning cons for transfer between a first and a second conveyor that the cans will be in selected correct locations on the second conveyor, and the present invention is concerned with accomplishing that. The same comment applies to the single transfer conveyor shown in U.S. Pat. No. 5,231,926.

SUMMARY OF THE INVENTION

Instead of utilizing the prior art complicated mechanism for rearranging the cans on the first transfer conveyor from a single row array to a two row array on the second conveyor, in the instant invention, on the first transfer conveyor the cans move only in a single row arrangement along a path of uniform radius about the rotational axis of the first transfer conveyor as a center. The rotation speeds of the mandrel wheel and of the first transfer conveyor are coordinated so that their peripheral speeds are set for spacing the cans transferred in a single row arrangement to the first conveyor at a useful, economical spacing on the first conveyor that may be shorter than the spacing between the row of cans on the decorating mandrel wheel. For example, the rotation speed of the rows of cans on first conveyor may be slower than the rotation speed of the row of cans rotating on the mandrel wheel. The cans are preferably secured at their bottom ends on the first conveyor by suction cups. The cans then travel in their row around the first conveyor to a transfer zone to be transferred to the second take-away conveyor.

At the next transfer zone, the cans are delivered to the rotating plate of the second takeaway conveyor. The circular path for the single row of cans carried by the first transfer conveyor crosses over obliquely and momentarily overlaps and is axially spaced away from two concentric outer and inner, circular suction applying tracks formed in the rotating plate of the second transfer conveyor. The tracks are formed about the rotation axis of the second transfer conveyor. As a first plurality of alternate cans in the row along the path of cans on the first conveyor overlap the outer track of the second conveyor, the first plurality of alternate cans are released from the circular path on the first transfer conveyor and engage the second transfer conveyor, being drawn to the second conveyor and held thereon by a suction force applied at the outer track. The remaining second plurality of alternate cans on the circular path on the first transfer conveyor are not released from the first transfer conveyor at the outer track of the second conveyor, but are instead rotated further until each second of the second cans on the path of the first conveyor overlaps the inner track of the second conveyor. The remaining second alternate cans are there released from the first transfer conveyor to be held on the second conveyor by a suction force applied at the inner track. Now the cans on the tracks of the second takeaway conveyor are in two rows.

The rotation speeds of the first and second conveyors are selected so that the speed of cans on the single row of the first conveyor and the speed of the cans at the inner and outer tracks of the second conveyor achieve desired spacing and separation of the cans on the inner and outer tracks of the second conveyor for economical operation, i.e., the more closely spaced the cans are, the greater is the rate of production for any given speed of the second conveyor and of the later transfer belt.

From the second conveyor, the two rows of cans are again transferred to a usually upward moving flight of a belt conveyor which carries the cans downstream toward a curing oven in two rows of cans. The belt, like the transfer conveyors, holds the cans preferably by suction, so that as the second conveyor is rotated so that cans approach the belt, the suction on the cans at the second conveyor is released and suction is applied through the belt to draw the cans to and transfer the cans to the belt. The speed of the belt is coordinated with the rotation speed of the tracks on the second conveyor to optimally space the cans on the belt conveyor. For example, the speed of the belt conveyor is below the rotation speed of the tracks to space the cans in the two rows on the belt to be as close as practical to each other as they are conveyed through the curing oven, and typically much closer together than the cans in the single row on the mandrel wheel and around the first transfer conveyor and closer together than the cans on the two tracks of the second conveyor.

Each of the first transfer conveyor, the second takeaway conveyor and the belt conveyor draws the cans to them and secures the cans to them preferably by suction applied to the cans, or optionally by magnetic attraction if the cans are ferrous metal. As a result, various provisions are made to insure that the cans are correctly positioned on all of those conveyors. The suction or magnetic force applied in each case and cups for holding the ends of the cans on the first conveyor are selected to position the cans correctly. But at the second conveyor and the belt conveyor where there is no element positively mechanically positioning the cans, some cans may be transferred to be off their desirable location or may fall away completely. It is recognized that an object following a circular, curved or otherwise profiled pathway is traveling along a tangent to that pathway at each instant. If a transfer involves a can being redirected obliquely across a tangent to the pathway on which it is then moving, there are dangers that the can may shift laterally off the selected path due to its inertia or that it may leave the desired path entirely where cans are held in position by suction or magnetic attraction.

In this apparatus, each transfer between conveyors occurs by movement of a axially from one of the conveyors in sequence on the path to another conveyor. There may be instances when the can is not in mechanical contact with either of the conveyors between which it is transferring during the instant of transfer and especially if at the time of transfer, the can is to be directed in a pith off the tangent to the pathway on which the can had just been traveling, the can may become mispositioned on the succeeding conveyor to which it is being transferred. Therefore, at each transfer between conveyors, the path of the cans on the preceding conveyor is along a straight pathway or is along a tangent to a curved pathway, such that the tangents to the path of the can on the conveyor which it is leaving is the same and parallel to a tangent on the path on the succeeding conveyor to which the can is being transferred. Implementation of this aspect of the transfer has enabled the operating speed of the can decorator to be increased. In contrast, in an arrangement where a tangent to the pathway from which the can is leaving is not the same as nor parallel to the tangent to the pathway to which the can is being transferred, the inertia of the can may cause the can to move off the desired tangential direction pathway of the transferee conveyor to which the can is being transferred. This has placed a limit on the speed of operation of the can decorator to ensure that can inertia does not move the cans off the desired transferee path. But where the tangents to the paths of the transferor and transferee conveyors at the can transfers are parallel, the inertia of a can will not shift the can off the desired transferee pathway before the can has been securely transferred to the transferee conveyor in the path. This has enabled a significantly higher operating speed for the can decorator.

To apply the foregoing principle to the transfer arrangement where the single row of cans on the first transfer conveyor is transferred to two concentric tracks on the second conveyor, the pathway of a plurality of the cans on the first conveyor must be adjusted.

The single row of cans on the first conveyor would normally cross over and above the outer track on the second conveyor and intersect the inner track of the second conveyor. Preferably, alternate cans in a first plurality of cans on the first conveyor are delivered to the inner track, while the next alternate cons in a second plurality of the cans on the first conveyor are delivered to the outer track, then a first can to the inner track, etc. The first and second conveyors, the path of the cans on the first conveyor, and the inner and outer tracks of the second conveyor are all so placed that the path of the first conveyor is tangent to the path of the inner track of the second conveyor and at the tangent location, the first plurality of cans are transferred, by the suction applied at the second conveyor, from the first conveyor to the second conveyor.

However, this same arrangement of the path of the cans on the first conveyor and of the tracks of the second conveyor causes a tangent to the path of the cans on the first conveyor to obliquely intersect a tangent to the outer track on the second conveyor, and those tangents are not parallel where the path on the first conveyor and the outer track on the second conveyor intersect. The cans to be transferred to the outer track are transferred at that intersection. At that transfer, the path each such can is traveling must be instantly redirected to the tangent to the outer track of the conveyor from the then path which is oblique to the tangent to the path on the first conveyor. At slower operating speeds, a sudden redirection of the cons at a transfer to the outer track of the second conveyor usually does not cause those cans to be displaced on the second conveyor. But as operating speeds increase, e.g. up to and above 2,000 cans per minute, the rotation speeds of the first and second transfer conveyors increase such that sudden redirection of the path of the cans at the outer track of the second conveyor may cause a can to shift out of its desired position at the outer track, or worse, may cause the can to separate entirely from the second conveyor before it is held to the second conveyor by the suction at the outer track. This could limit the maximum operating speeds.

According to a modified embodiment of the present invention, selected ones, e.g., the alternate second plurality of cans in the single row of cans that are transferred in a single row from the mandrel wheel to the first transfer conveyor, are shifted radially inwardly on the first transfer conveyor as they are rotated to approach the transfer from the first conveyor to the outer track of the second conveyor, so that at the transfer of the second plurality, and particularly alternate cans from the first conveyor to the outer track of the second conveyor, the radius on the first conveyor of the path of the cans to be transferred to the outer track is shortened so that the tangent to the path of the cans on the first conveyor overlaps and is parallel to the tangent of the outer track on the second conveyor where the transfer takes place. This expedient assures that the first plurality of alternate cans being transferred from the first conveyor to the inner track and the second plurality of cans being transferred from the first conveyor to the outer track are transferred where the tangents to their respective paths on the first conveyor are parallel to the tangents to their respective paths on both the inner and outer tracks of the second conveyor. The above described limit on the operating speed of the transfer arrangement described above is thereby eliminated and more rapid can decoration may be expected.

The further transfer of cans from the two rows of the second transfer conveyor to the belt is readily accomplished because the path of the belt at the transfer from the second conveyor to the belt may be selected so that the belt is moving parallel to the tangent to each of the tracks on the second conveyor at the transfer to the belt.

Accordingly, the primary object of this invention is to provide simplified apparatus that conveys cans from a continuous motion high speed decorator through a curing oven without placing the cans on pins of a deco chain.

Another object is to provide apparatus of this type in which there are partially overlapping first and second transfer conveyors that rotate on laterally offset parallel horizontal axes, with the second transfer conveyor including a rotating plate having a planar surface that receives cans from the first transfer conveyor with the open ends of the cans directly engaging a planar surface which is perpendicular to the rotational axis of the second transfer conveyor.

Yet another object is to transfer cans on a single circular path of a first rotating conveyor to first and second concentric circular tracks of a second rotating conveyor.

A further object is to operate the transfer conveyors to minimize spacing between cans for economical operation.

Another object is to increase the rate of can production and thus the speed, while maintaining positive control over the motion of the cans as they are transferred from the decorator mandrel wheel, over the transfer conveyors and to a curing oven.

A still further object is to provide apparatus of this type in which linear speed for containers on the second transfer conveyor may be less than the linear speed for the containers on the first transfer conveyor.

Still another object is to provide apparatus of this type in which the cans are transferred directly from the planar surface to a moving vertical flight of a belt conveyor.

A further object is to provide. apparatus of this type having operating principles that enable suction as well as magnetic forces to be utilized for holding ferrous containers.

Yet another object is to provide apparatus of this type wherein cans are held by suction devices that include very shallow flexible suction cups with stiff backups closely spaced from the flexible cups and with the cups being so large that they remain totally outside of the inverted domes that are at the closed ends of the cans.

BRIEF DESCRIPTION OF THE DRAWINGS

The foregoing objects as well as other objects of this invention will become apparent to those skilled in the art after reading the following description of the accompanying drawings in which.

DETAILED DESCRIPTION OF THE DRAWINGS

As may be desired to amplify the following description, reference should be made to the aforesaid U.S. Pat. No. 5,749,631 as well as other prior art previously noted and incorporated herein.

Figure 1:
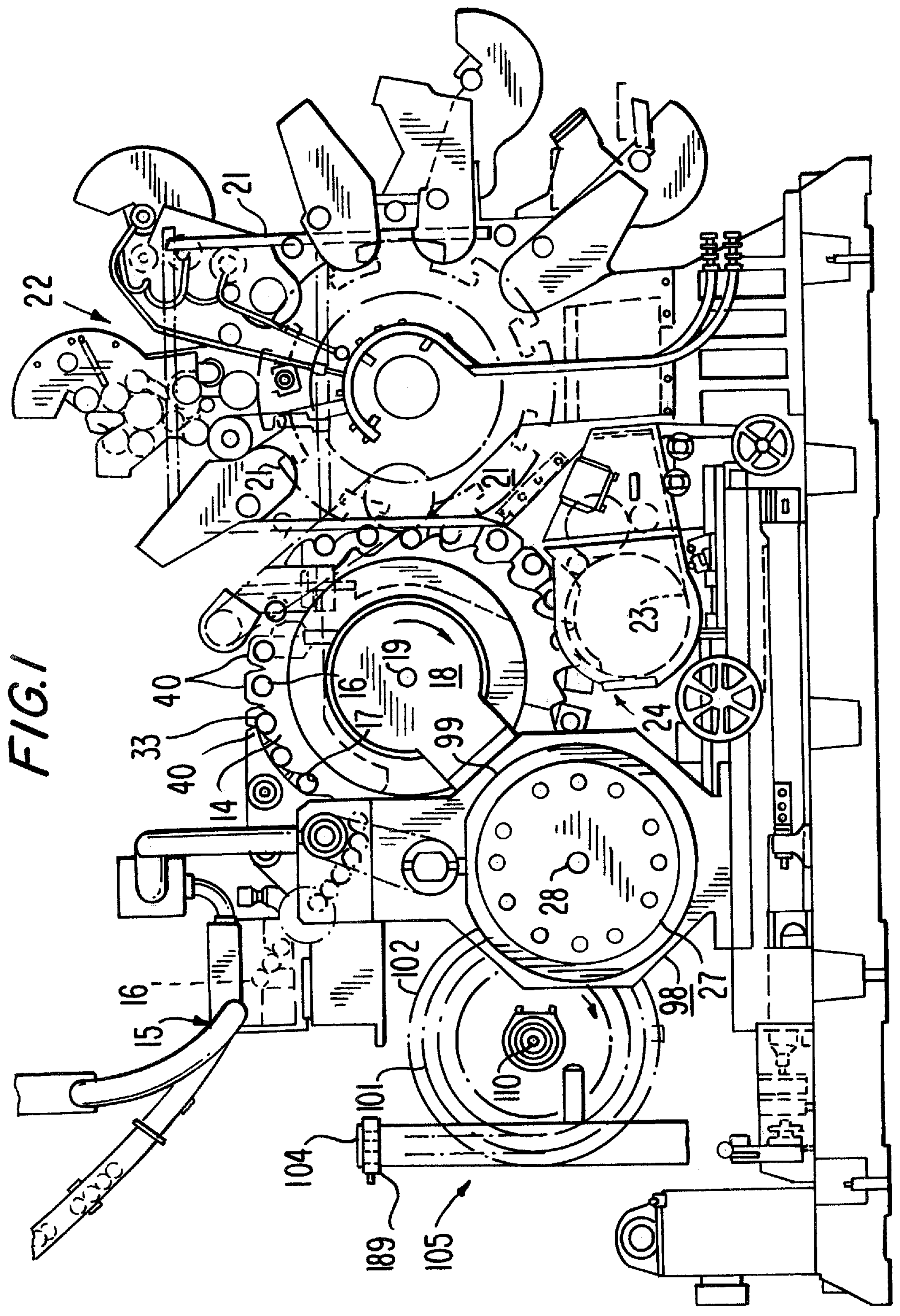
FIG. 1 is a side elevation of continuous motion can decorating apparatus constructed in accordance with teachings of the instant invention.

Drawing FIG. 1 illustrates a first embodiment of a continuous motion cylindrical can decorating apparatus which includes the instant invention. The input end at the right side of the apparatus illustrated in FIG. 1 herein is the same as the input end of the apparatus illustrated in FIG. 1 of U.S. Pat. No. 5,749,631. However, in the instant invention the first transfer conveyor 27, which delivers cans 16 to forward surface 101 of the second transfer conveyor 102 that rotates about stub shaft 110 as a center, does not require cans 16 to move radially toward the rotational axis 28 of the first conveyor 27 as a function of the angular position of the cans 16. (The below described second embodiment of FIGS. 9–11 differs.)

Figure 3:
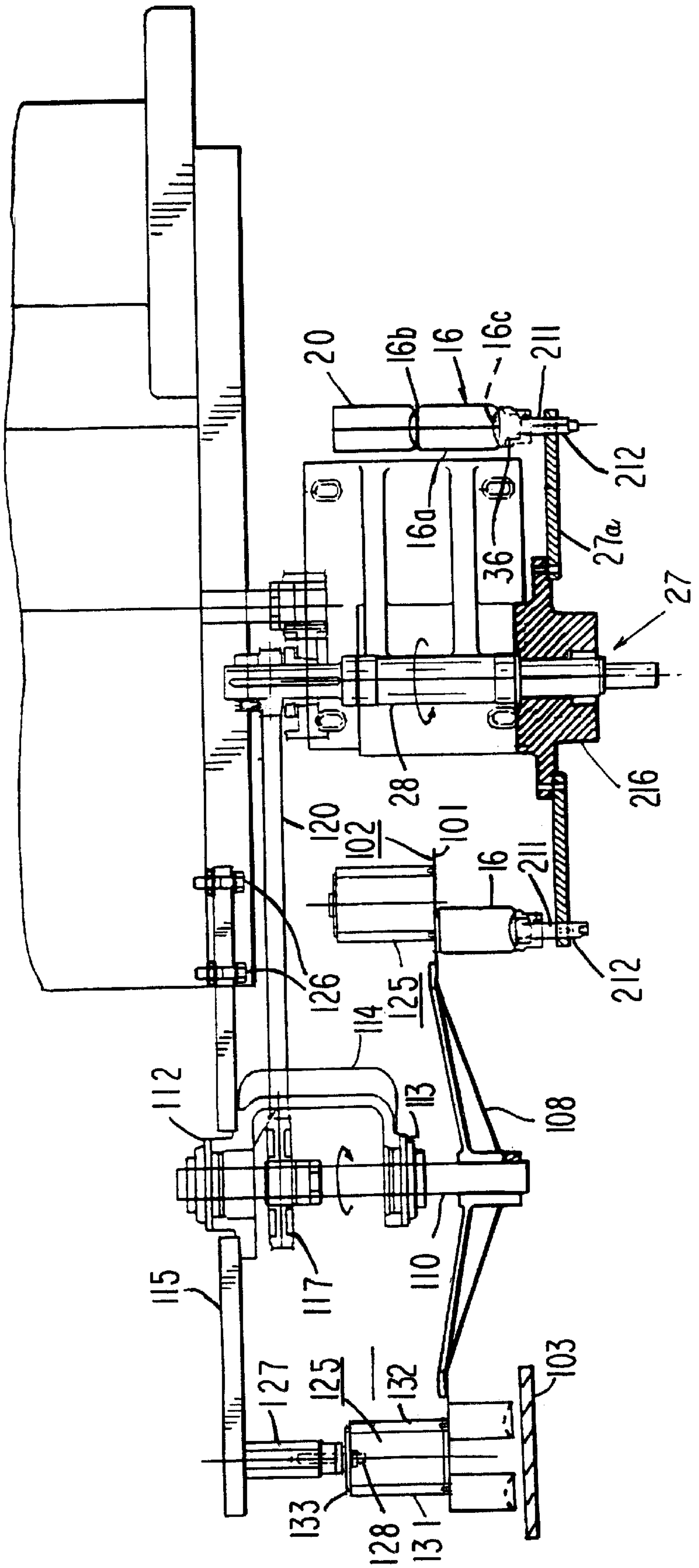
FIG. 3 is a simplified top view of significant transfer elements seen in FIG. 2.

The apparatus of FIG. 1 herein includes infeed conveyor chute 15 which receives undecorated cans 16 each open at one end 16*b* thereof (FIG. 3), from a can supply (not shown) and places them in arcuate cradles or pockets 17 along the periphery of aligned axially spaced rings 14 that are fixedly secured to wheel-like mandrel carrier 18 keyed to horizontal drive shaft 19. Horizontal spindles or mandrels 20, each part of an individual mandrel/actuator subassembly 40, are also mounted to wheel 18 with each mandrel 20 normally being in spaced horizontal alignment with an individual pocket 17 in a short region extending downstream from infeed conveyor 15. In this short region undecorated cans 16 are moved horizontally rearward, being transferred open end first from each cradle 17 to an individual mandrel 20. Suction applied through an axial passage extending to the outboard or front end of mandrel 20 draws container 16 rearward to final seating position on mandrel 20 where the closed end 16*c* of can 16 engages the outboard end of mandrel 20. Each mandrel 20 should be loaded properly with a can 16 by the time mandrel 20 is in the proximity of sensor 33 which detects whether each mandrel 20 contains a properly loaded can 16. In a manner known to the art, if sensor 33 detects that a mandrel 20 is unloaded or is not properly loaded, as this particular mandrel 20 passes through the decorating zone, wherein printing blanket segments 21 normally engage cans 16 on mandrels 20, this unloaded or misloaded mandrel 20 is moved to a "no-print" position in which neither it nor a can 16 carried thereby will be engaged by a blanket segment 21.

While mounted on mandrels 20, cylindrical sidewall 16*a* of each can 16 is decorated by being brought into engagement with one of the continuously rotating image transfer mats which form blanket 21 of the multicolor printing press decorating section indicated generally by reference numeral 22. Thereafter, and while still mounted to a mandrel 20, each decorated can 16 is coated with a protective film, typically varnish, applied thereto by engagement with the periphery of applicator roll 23 in the overvarnish unit indicated generally by reference numeral 24. Cans 16 with decorations and protective coatings thereon are then transferred from mandrels 20 to holding elements or pickup devices on a disk or wheel 27*a* comprising part of the first transfer conveyor 27, constituted by suction cups 36.

Carried by transfer conveyor disk 27*a*, and for the most part projecting rearward therefrom, are twenty hollow posts 211 that are in a circular array formed about rotational axis 28 as a fixed center. An individual suction cup 36 is mounted at the rear of each post 211 and the front portion of each post 211 is an externally threaded portion to be received by a complementary internally threaded aperture extending through conveyor disk 27*a*. To the front of disk 27, each post 211 mounts an individual lock nut 212. An individual flat washer 229 is compressed between each nut 212 and the front surface of transfer conveyor disk 27*a*.

During transfer of cans 16 from mandrels 20 to suction cups 36, the suction cup pickup devices 36 are traveling in single file or row along the periphery of conveyor 27 in a first transfer zone indicated by reference numeral 99 (FIG. 2) that is located between overvarnish unit 24 and the infeed of cans 16 to pockets 17. Conveyor 27 rotates about horizontal shaft 28 as a center and move the cans 16 to a second transfer zone 98 at which the cans 16 carried by conveyor 27 are transferred to the forward planar surface 101 of ring-shaped, second transfer conveyor 102, as described below.

An individual tube or hose 213 connects the front end of each post 211 on the disk 27*a* to the rotatable portion of face valve 215 at hub 216 that is secured to the center of shaft 28 by a plurality of screws 217. Key 218 drivingly connects hub 216 to horizontal shaft 28 which extends through short tube 219 that is welded to spaced vertical members 221, 222 which project upward from base 225 of the stationary machine frame. Bearings 226, 227 at opposite ends of tube 219 rotatably support shaft 28. Ringfeder 228 on the reduced diameter front portion of shaft 28 holds the latter in axial position. A sprocket (not shown) mounted to shaft 28 near the rear thereof receives driving power that continuously rotates shaft 28 and elements mounted thereon.

Each tube 213 is connected to an individual port 231 at the periphery of hub 216, and internal passages 232 in hub 216 connect each port 231 to another port 232 that is in sliding engagement with wear plate 233 at interface 234 between the moving and stationary sections of face valve 215.

As will be explained, the single row of cans 16 on conveyor 27 is transformed into a two parallel row arrangement of cans 16 as they are transferred to second conveyor 102. The two row arrangement consists of the respective outer and inner tracks 151, 152 (FIG. 4) defined by concentric shallow circular grooves in face 101 of conveyor 102 formed about rotational axis 110 of conveyor 102 as a center. Suction is applied to the cans at the grooves, as described below.

Conveyor 102 carries cans 16 downstream from transfer zone 98 through a holding zone that extends to loading zone 95 where closed ends 16*c* of cans 16 are in close proximity with the upward moving vertical flight 103 of closed loop perforated belt conveyor 105. Cans 16 on conveyor 102 are drawn forward to engage vertical flight 103 by suction forces generated in a well known manner to apply suction through perforated conveyor belt 105 and rearward of flight 103. For example, the open top of a suction box may be disposed behind the belt. At its downstream or upper end, flight 103 is guided by suction idler roll 189 and is connected with horizontal flight 104. Belt conveyor 105 may convey cans 16 through a curing oven(not shown) or to one or more additional conveyors (not shown) that will convey cans 16 through the curing oven.

U.S. Pat. No. 5,183,145 discloses that in transfer region 99, spacing between adjacent holding devices 36 is substantially less than spacing between adjacent mandrels 20 and the latter are traveling at a linear speed substantially faster than that of holding devices 36. In addition, U.S. Pat. No. 5,183,145 discloses how the position of a relatively stationary valve element (not shown) is adjusted automatically to maintain coordinated operation between mandrel carrier 18 and transfer conveyor 27 as linear speed differences between mandrels 20 and holding devices 36 vary. The distance between cans is adjusted, dependent upon the diameters of the paths of the cans on the conveyors and the speeds of the conveyors, for optimum can spacing.

Circular opening 107 at the center of ring-shaped second conveyor plate 102 is closed by circular cover 108 (FIG. 3), with a plurality of bolts (not shown) along the periphery of cover 108 extending through clearance apertures 111 (FIG. 4) to fixedly secure ring plate 102 to cover 108. The cover is keyed to stub shaft 110 which is rotatably supported in axially spaced bearings 112, 113 mounted on opposite arms of U-shaped bracket 114 that is secured to mounting plate 115. Driven sprocket 117, disposed between the arms of bracket 114, is mounted on shaft 110 and keyed thereto. Double sided timing belt 120 is engaged with the teeth of driven sprocket 117 and a drive sprocket (not shown). The latter is keyed to transfer carrier drive shaft 28.

A plurality of bolts 126 fixedly secure mounting plate 115 to a stationary frame portion of the apparatus, with a plurality of standoffs 127 projecting forward from mounting plate 115. An arcuate plenum structure or manifold 125 is secured to the forward ends of standoffs 127 by a plurality of bolts 128. Plenum structure 125 includes concentric circular sidewalls 131, 132 connected by rear wall 133 to form a circular trough. The free front edges of sidewalls 131, 132 are held apart by a plurality of rod-like elements 134 as well as by barrier partitions 136 and 137 at the respective upstream and downstream ends of suction plenum 135 that is formed therebetween and extends for the lower half of the trough formed by structure 125.

Rotating conveyor plate 102 is disposed in front of plenum structure 125, being closely spaced with respect thereto to provide a cover for plenum 125. A suitable spacing is maintained between rear surface 159 of plate 102 and the free forward ends of plenum side walls 131, 132.

Figure 4:
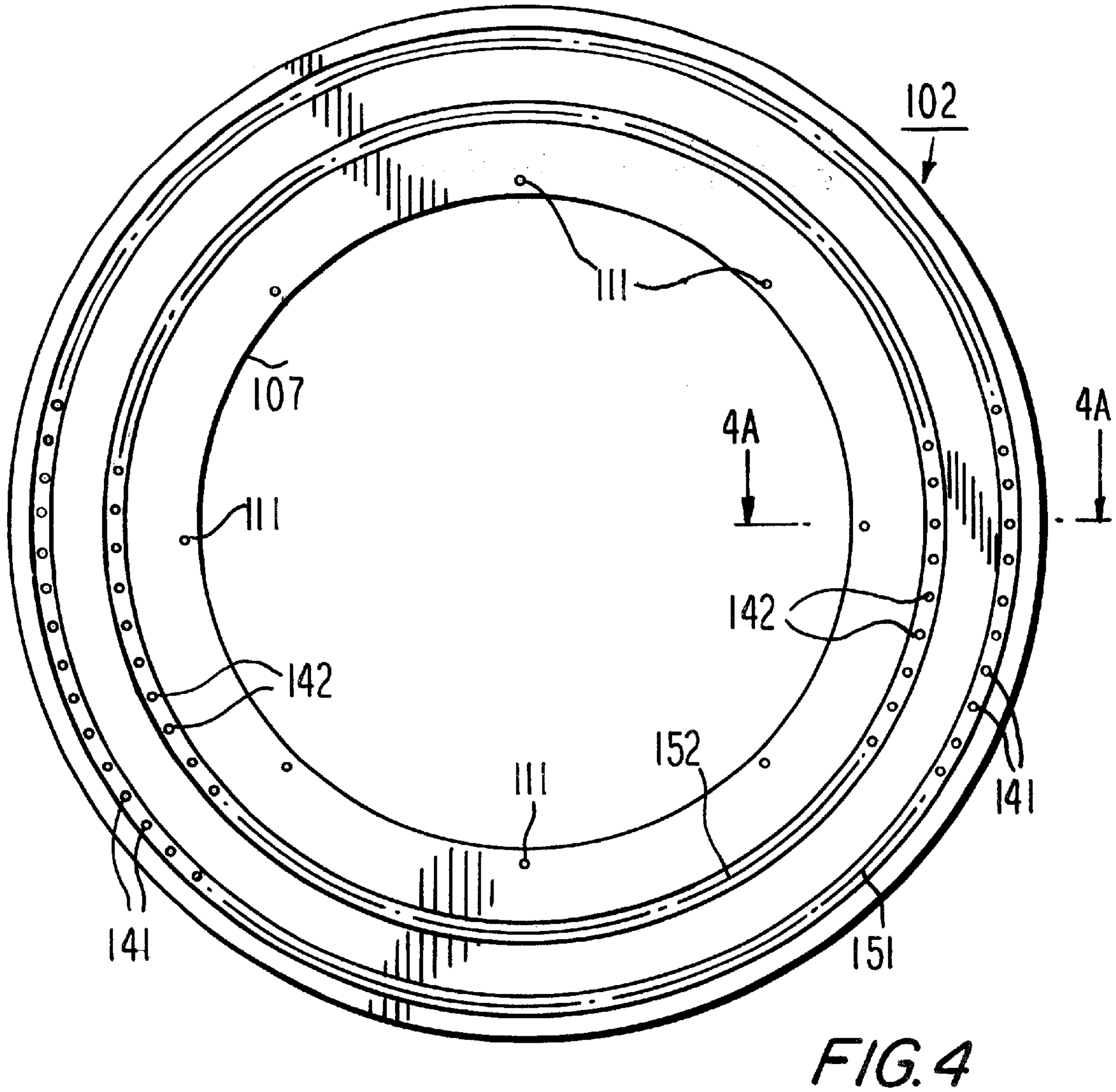
FIG. 4 is a side elevation of the transfer conveyor plate.
Figure 4A:
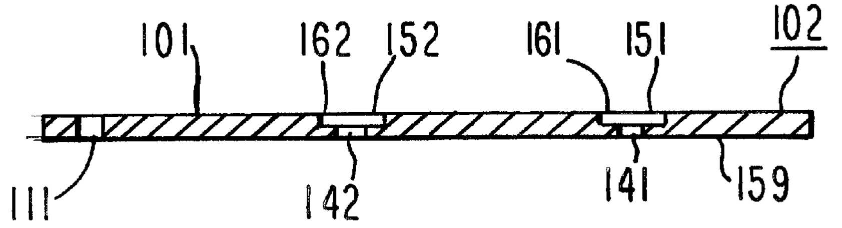
FIG. 4A is a cross-section taken through line 4A—4A of FIG. 4 looking in the direction of arrows 4A—4A.
Figure 6:
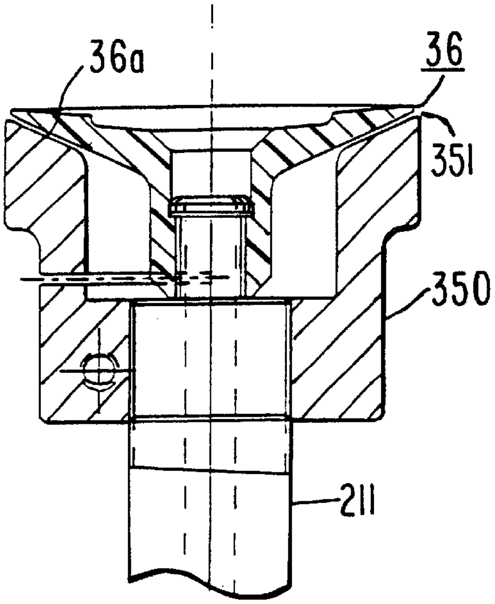
FIG. 6 is a side elevation of the suction cup portion seen in FIG. 5.
Figure 5:
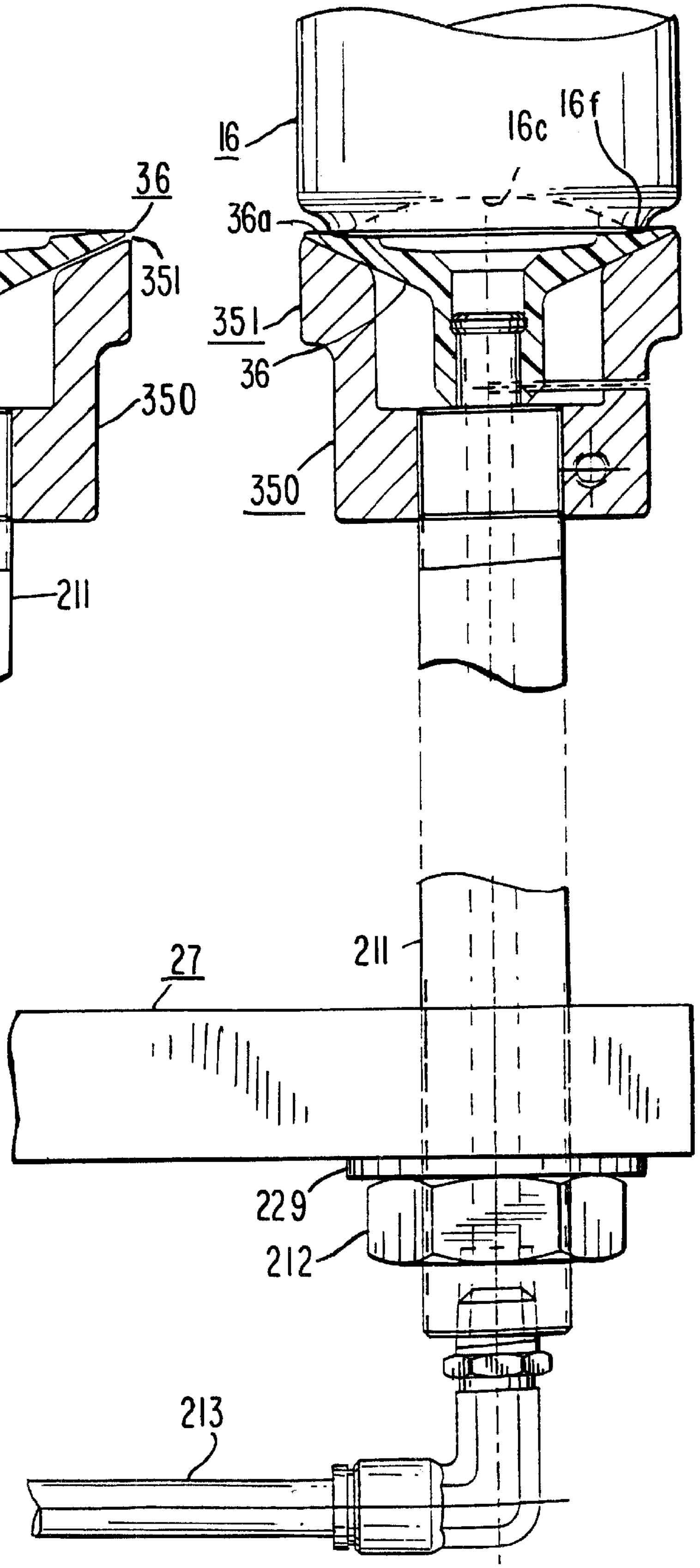
FIG. 5 is a side elevation of one of the suction pickup units of the first or transfer suction conveyor, with a can being held by such suction pickup.
Figure 7:
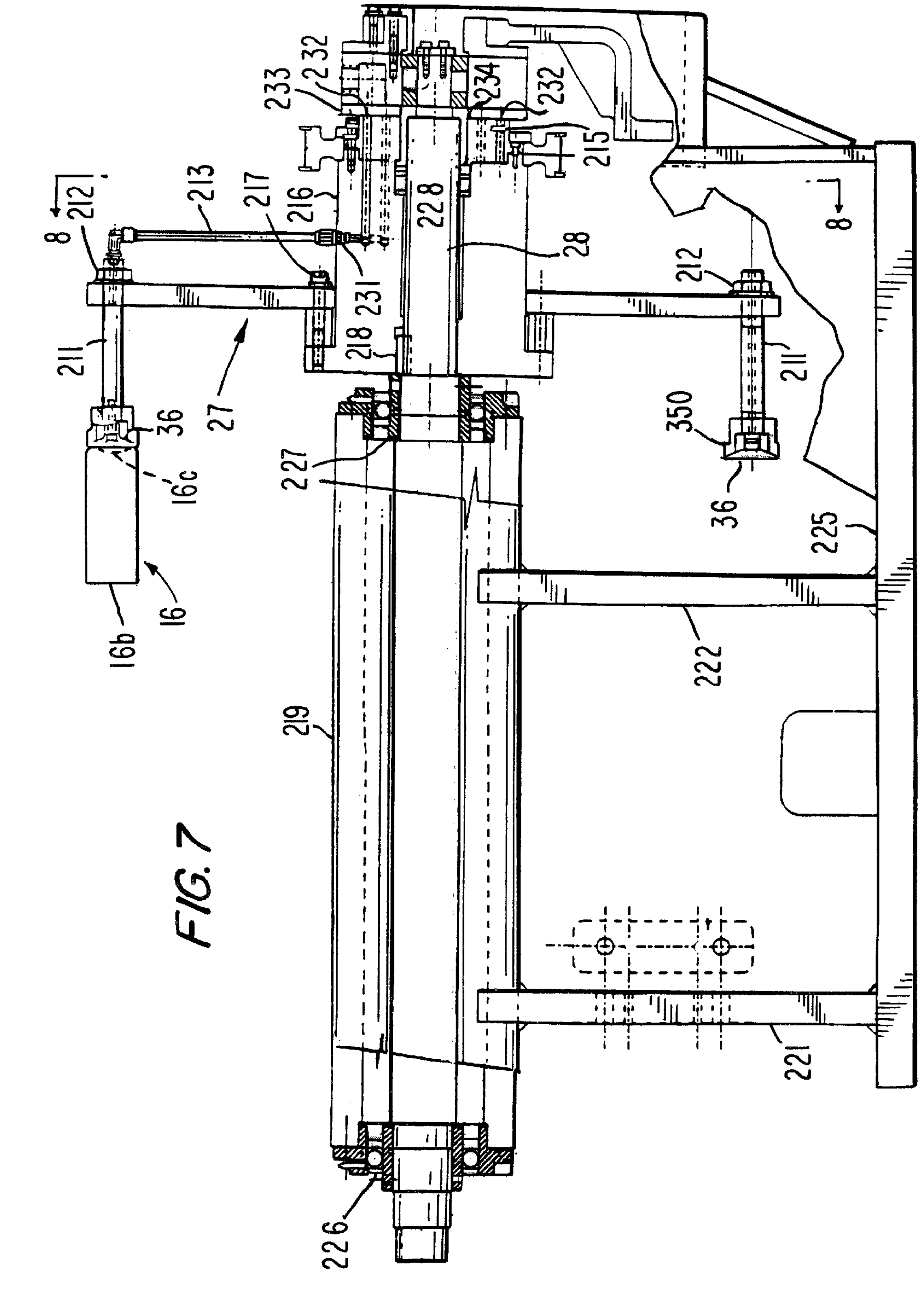
FIG. 7 is a diametric cross-section of the first suction conveyor and its mounting to the apparatus frame.
Figure 8:
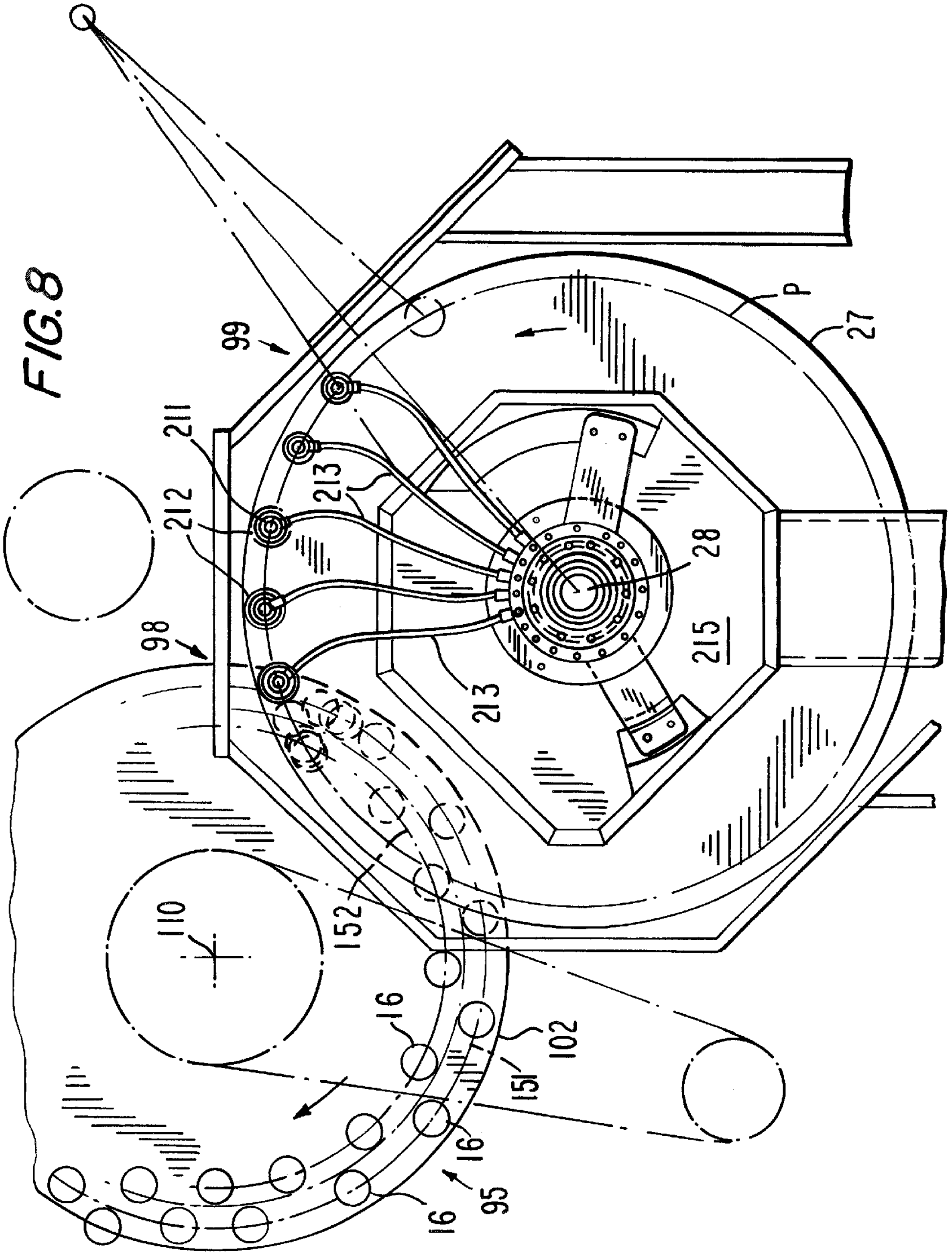
FIG. 8 is a partial end view of the first suction conveyor looking in the direction of arrows 8, 8 in FIG. 7.

As seen best in FIG. 4, transfer conveyor plate 102 is provided with a plurality of apertures 141 that are arranged in a single row to form an outer circular array or track and another plurality of apertures 142 that are arranged in a row to form an inner circular array or track. The inner and outer circular arrays of apertures 141 and 142 are concentric about rotational axis 110 for conveyor 102 as a center. The front facing surface of conveyor 102 is provided with concentric circular undercuts 151, 152 that are very shallow. Apertures 141 of the outer array extend rearward from floor 161 of outer undercut 151 and apertures 142 of the inner array extend rearward from floor 162 of the inner undercut 152.

With the construction illustrated each can 16 is held on transfer conveyor 102 by suction forces which draw air into plenum 135 through essentially two apertures 141 when can 16 is at the outer array and by substantially two apertures 142 when can 16 is at the inner array.

Undercuts that define concentric tracks 151, 152 are provided in transfer conveyor 102 to prevent buildup of excess suction force that could cause cans 16 to collapse, as might occur if the entire free end of the can sidewall was to seal against the forward facing surface of transfer conveyor 102.

Figure 11:
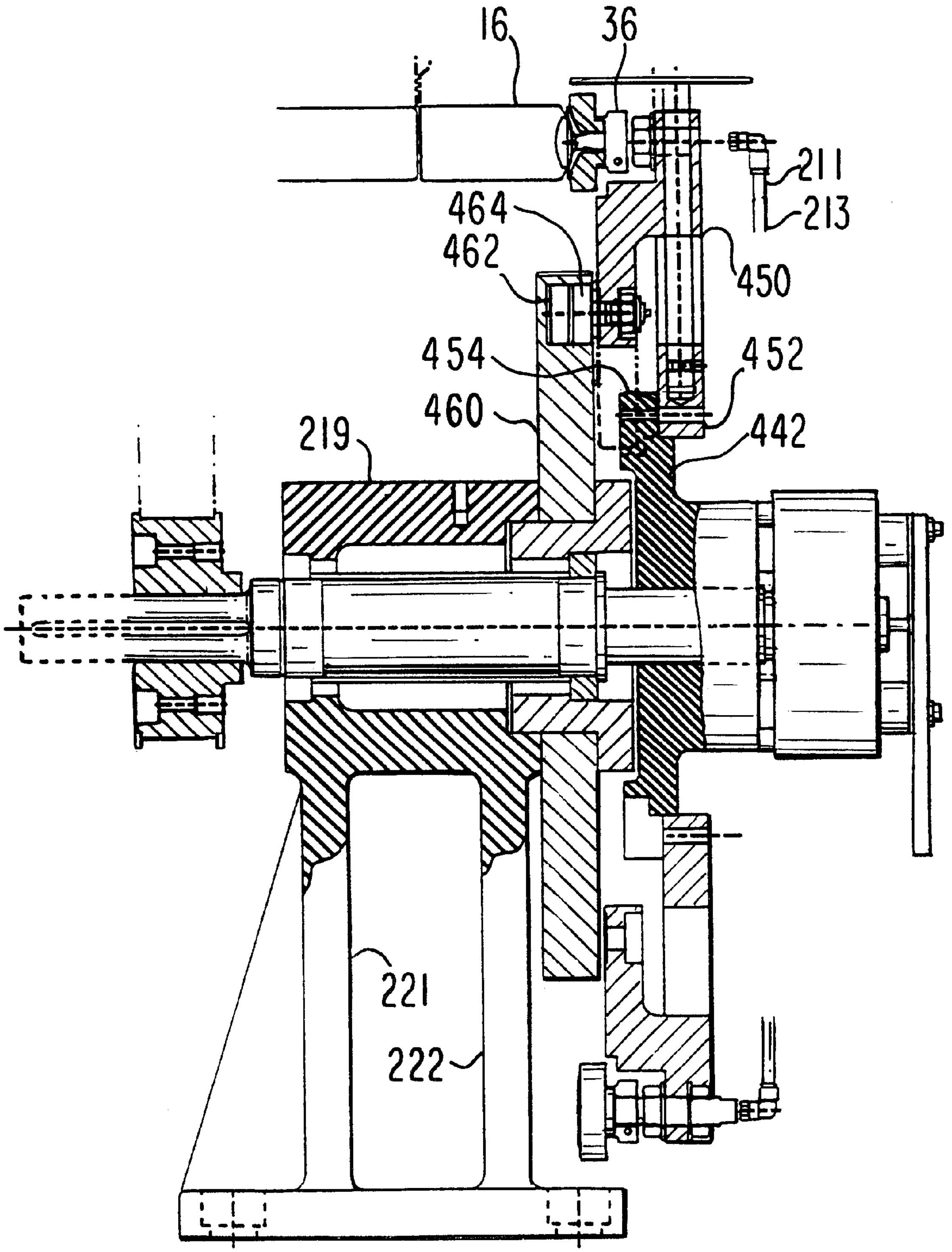
FIG. 11 is a cross sectional view at line 11—11 in FIG. 10 of the first transfer conveyor wheel.

Thus it is seen that the instant invention provides a continuously rotating suction transfer conveyor plate in combination with a suction conveyor belt to replace a conventional pin oven conveyor chain. While, suction holding is suitable for handling both ferrous and non-ferrous (i.e. aluminum) cans, when ferrous cans are being decorated, magnetic rather than suction forces may be used to attract and hold the ferrous cans on the conveyor plates and/or belt. This is illustrated in FIG. 11, with magnetic arcuate strips of an arcuate extent like that of the plenum 135 in FIG. 2, placed below the conveyor 102, which is e.g., of plastic or other substance which does not interfere with a magnetic field acting on steel cans.

Now referring more particularly to FIGS. 2, 3, 5 and 8, cans 16 are transferred from mandrels 20 to suction cups 36 in region 99 by applying pressure that moves cans 16 forward until they are suction held on cups 36. Now. cans 16 travel counterclockwise along circular path P which crosses concentric tracks 151, 152 in the upstream portion of region 98 where the holding suction at each cup 36 changes to rearward directed pressure that transfers cans 16 to the back 101 of conveyor 102 where suction applied therethrough holds cans in place on conveyor 102. In region 95 the backward directed suction through plate conveyor 102 is discontinued and forward directed suction acts through the vertical flight of conveyor belt 103 to draw cans 16 forward onto belt 103. The arcuate ends 136 and 137 of the plenum 135 are positioned to deliver suction to the cans on the conveyor 102 at the regions indicated.

As cans 16 pass through region 98 suction holding forces acting on alternate ones of suction cups 36 are discontinued at their respective tubes 213 as these suction cups 36 pass in front of the outer track 151 so that these alternate cups 36 come under the influence of suction in manifold 125 and are drawn rearward against the front surface of conveyor 102. The suction holding forces that act on the remaining alternate ones of the suction cups 36 are discontinued also at their tubes 213 as these suction cups 36 pass in front of the inner track 152 so that the remaining alternate suction cups 36 come under the influence of the suction in plenum structure or manifold 125 and are drawn rearward against front surface of conveyor 102 which proceeds to carry two concentric rows of cans 16 from region 98 to region 95.

Positions for cans 16 are stabilized by gripping the cans 16 firmly as they are being held on rotating conveyors 27 and 102. This firm grip is obtained by providing circular chime 16f of can 16 with a smaller diameter than main support or holding surface 36*a* of deflectable ring suction of suction cup 36. Each flexible cup 36 is mounted in an individual relatively stiff cup 350 secured to the rear of post 211. When cup 36 is in its unstressed condition, there is a very narrow gap 351 behind surface 36*a*, and when cup 36 is stressed by introducing suction forces into post 211 or by applying a forward directed force against support surface 36*a*, the latter is displaced only slightly from the position occupied by surface 350 when cup 36 is unstressed. The stiff backing provided by cup 36 limits distortion of cup 36 to a point where cup 36 does not enter the inside of the dome defined by the bottom 16*c* of can 16. Thus, as the shape of cup 36 changes because cup 36 is subjected to stressed and unstressed conditions, that change in shape is very small. Hence, those changes can take place very rapidly and without causing large deflection of cup 36. During the transfers of a can from its respective holding mandrel to the first conveyor, and particularly from the first to the second conveyors, the can is traveling a short axial distance and may tilt or cant or bang or hit an edge. Therefore, a short axial spacing between the wheels and conveying devices at the transfers of the cans is desired.

Figure 2:
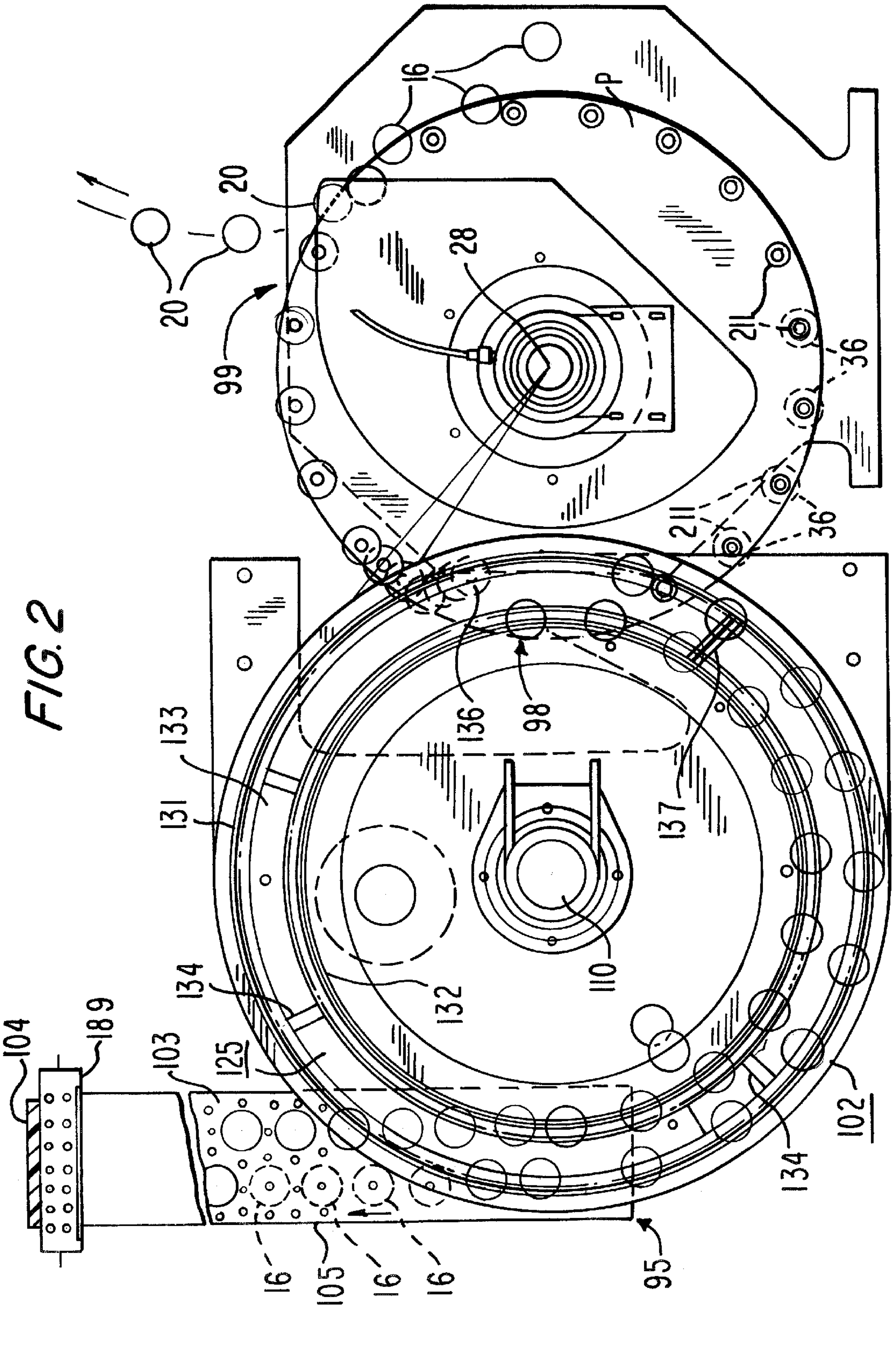
FIG. 2 is a fragmentary side elevation in schematic form of the major can carrying and transfer elements.

FIG. 2, at the entrance to the transfer zone 98, illustrates the sharp change in direction that the cans 16 undergo as they move from the row thereof on the first conveyor 27 to the outer track 151 on the second transfer conveyor 102. That sharp change in direction might not interfere with the proper positioning of the cans on the second transfer conveyor at relatively slower rotation speeds of the first and second conveyors. But higher rate can production involves higher rotation speeds of the transfer conveyors. The sharp change in direction may cause the cans being transferred to the outer track 151 of the second conveyor to skid past their proper position on the track 151 due to their inertia, which undesirably mispositions those cans. As noted above, it is desirable that the cans transfer from one conveyor to the other along respective paths on both conveyors where the tangents to both paths at the point of transfer of the can from one rotating conveyor to the other overlap and are parallel. This enables the path of a can transferring between one part of its path through the apparatus to any other part, and in particular transferring between the first conveyor 27 and the respective track on the second conveyor 102, to not be across a tangent to the path of the can on either of the conveyors, but rather to be parallel to both tangents at each transfer because both tangents are overlapping and parallel at the transfer.

Figure 9:
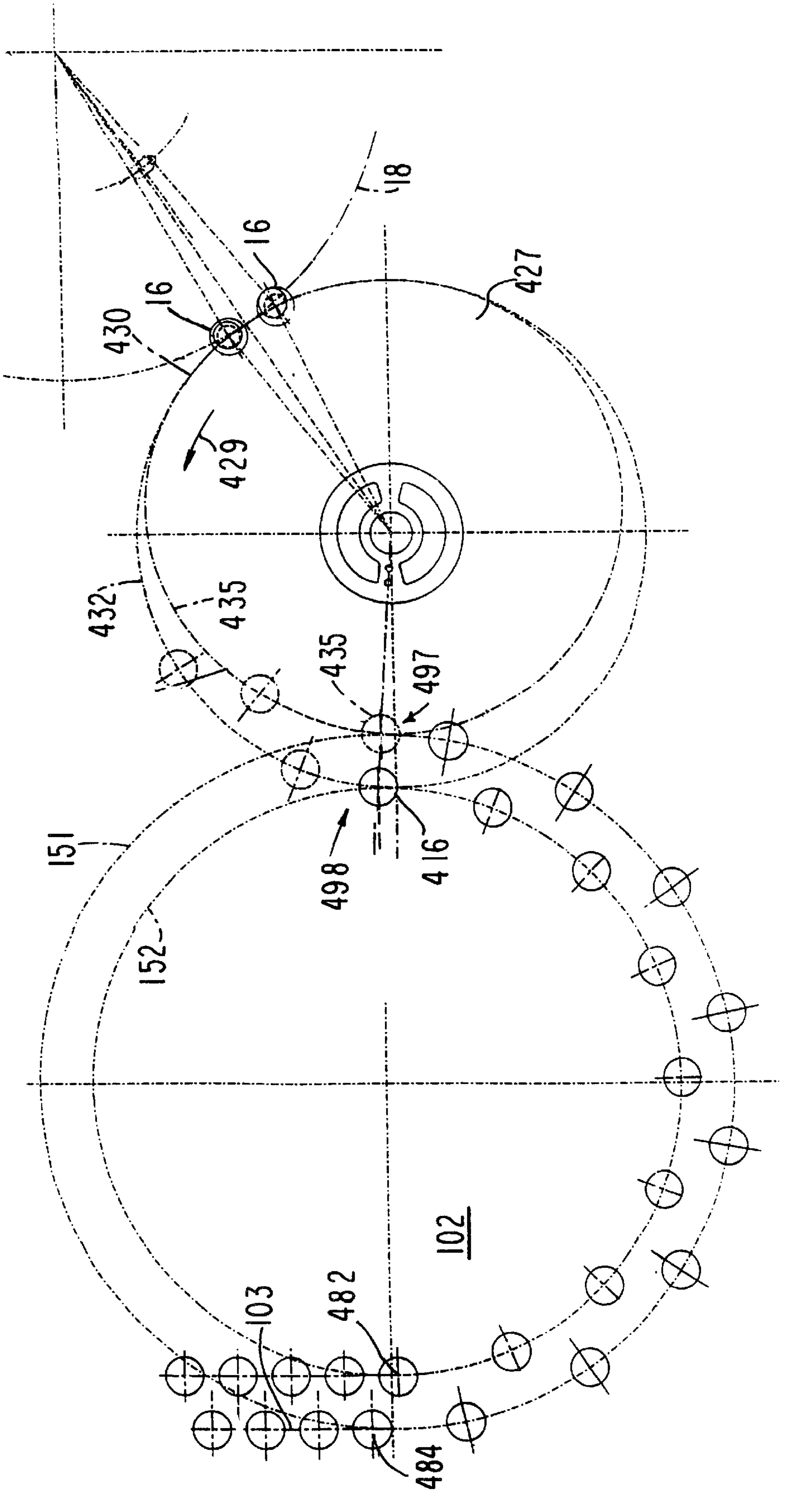
FIG. 9 is a schematic showing of the travel pathways of cans from the mandrel wheel to the belt conveyor, when a second embodiment of can decorating apparatus, in particular with vacuum transfer conveyors, is used.

FIG. 9 illustrates a modified pathway of the cans through the decorating apparatus, from the mandrel wheel to the belt carrying the cans to the curing oven, wherein at each transfer within the apparatus, the tangent to the can path on the transferor element and the tangent to the path of the can on the transferee element are overlapping and parallel so that the can need not make a sharp redirection in its travel between the transferor and transferee pathways.

Referring to FIG. 9, the cans 16 come off the mandrel wheel 18 as previously described onto the first transfer conveyor 427, which travels counterclockwise in the direction of arrow 429. Initially, the pathway 430 of all of the cans 16 on the mandrel wheel is a single path. However, as the cans are rotated by conveyor 427 and approach the transfer zone 498 to the second transfer conveyor 102, two divergent paths develop. A radially outer path 432 combines with the path 430 in a circle with a radius so selected and with the positions of the conveyors 427 and 102 so selected that the point at which the transfer between the cans 16 on the outer path 430, 432 to the radially inner track 152 on conveyor 102 is along the common, parallel, overlapping tangents to both the path 430, 432 and the track 152. As a result, when each can 16 then at the illustrated position of the can 416 transfers between the path 430, 432 and the track 152, there is no sharp change in direction of the can. The path 430, 432 and the transfer positions for cans 16 shown in FIG. 9 are consistent with the first embodiment as shown in FIG. 2. The cans 16 on the path 432 are a first plurality of cans and each alternate can around the conveyor 427 is in the first plurality.

The alternate second plurality of cans 16 in the row on the path 430 are supported, as described below, to move not on a circular path but on a path 435 of gradually diminishing radius until they reach the illustrated transfer position of the can 436. At that position, the can 436 on path 435 is at the same radial position as the outer track 151 on the conveyor 102. Can 436 is at the position where the transfer of cans from path 435 to the outer track 151 takes place. The tangent to the path 435 at the can 436 is the same, parallel and overlapping tangent to the path of the outer track 151 at can 436. Because the tangents of the path 435 and track 151 are there parallel and overlapping, the can 436 does not undergo sudden change in direction across either of the tangents at the transfer and the can is therefore likely to retain its selected proper position on the track 151. The contrast with the transfer between the conveyor 27 and conveyor 102 of the can at 16 in FIG. 2 is dramatically different, as can be seen in FIG. 2 where the sharp change in direction takes place.

As above described, the cans on the second conveyor 102 are rotated to the belt conveyor 103 and are there transferred to the belt conveyor 103 as in the preceding embodiment. It can be seen that the transfer to the belt conveyor takes place on tangents to both of tracks 151 and 152 and on a tangent to the belt, which are all parallel.

Figure 10:
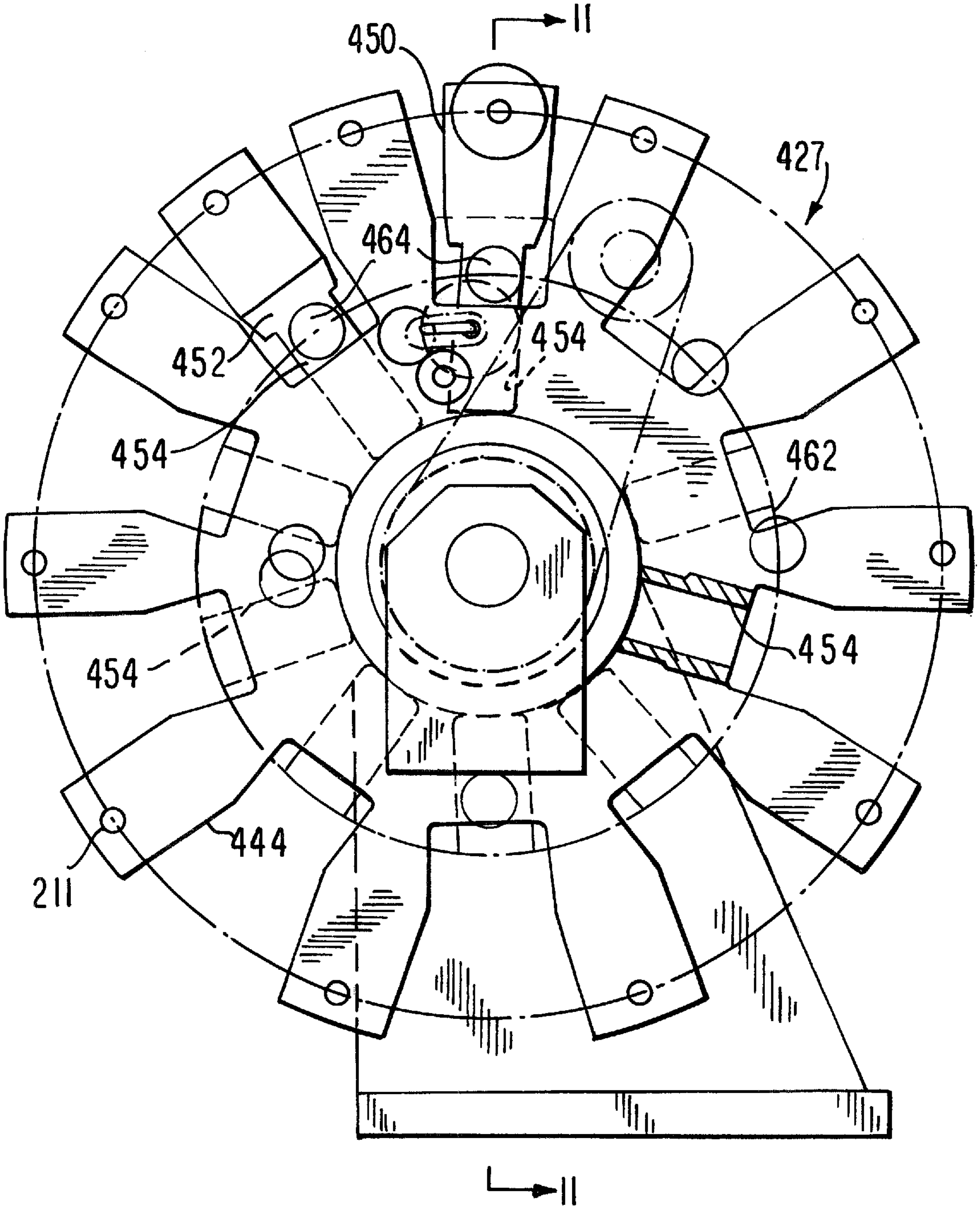
FIG. 10 is a side elevation of the first transfer conveyor wheel for the second embodiment.

The primary difference between the first and second embodiments of FIGS. 2 and 9, respectively, is in the first transfer conveyor 427 of the second embodiment, which is illustrated in FIGS. 10 and 11. The conveyor 427 differs from conveyor 27 in the first embodiment in that the suction support for the second plurality of preferably alternate ones of the cans are radially movable to follow the path 430, 435 as conveyor 427 rotates. In its simplest form, the second plurality of alternately movable cans are each on a respective support that is cam guided to move radially along path 430, 435 as conveyor 427 rotates.

Conveyor 427 has a "daisy wheel" like main body 442 with a number of radially projecting support arms 444, each. having a connection for holding the respective can. The connections correspond to elements 37, 36, 211, 212 in FIG. 3. Rather than the entire conveyor 427 having such a fixed radius structure, such structure is found on only the supports 444 for alternate ones of the cans 16 in the first plurality. The cans 16 held on the supports 444 do not change their radial positions on the wheel and are positioned radially so as to follow the path 432 (FIG. 9) and be transferred to the inner track 152 of the second rotatable conveyor 102.

Interleaved between adjacent supports 444 are the radially shiftable support panels 450. Each of those panels has a radially inwardly extending base region 452 which is received in a respective radially extending slot 454 on the rearward face of the body 442. The cooperation between each slot 454 and the base region 452 of the respective panel 450 guides the panel for radial reciprocating motion, without permitting the panel 450 to tilt off its radius.

The tube 219 on the vertical members 221, 222 of the frame supports a stationary upstanding cam body 460 having a channel shaped cam 462 that passes around the centeraxis of the cam body. The cam 462 has a profile around the cam body 460 that corresponds in profile, shape and change in radius from the axis of the body to the path 435 in FIG. 9, along which the cans 16 are shifted radially inwardly until they rotate to the transfer 497. The channel shaped cam 462 opens rearwardly of the body 460. Affixed to the forward face of each radially movable can supporting panel 450 is a respective cam follower 464 which rides in the channel shaped cam 462, and this guides the panels 450 radially inwardly and outwardly as the wheel rotates.

The various suction connections to retain a can to the first conveyor 427 are the same for the stationary can holding supports 444 and for the panels 450. Flexible hose at all connections 211, 213 absorbs the radial motion of the panels 450.

Figure 12:
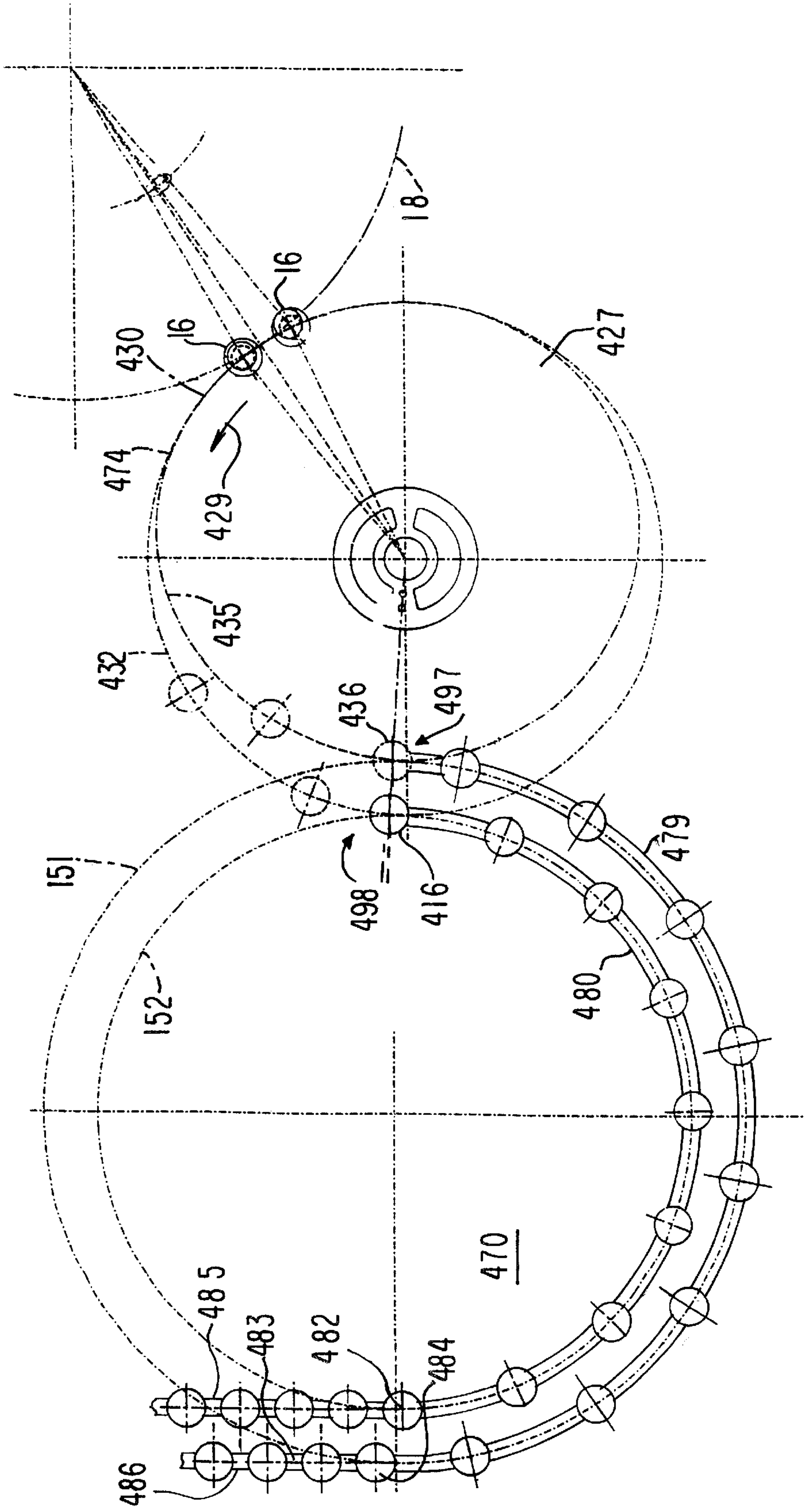
FIG. 12 illustrates an alternate embodiment of the transfer arrangement using magnetic transfer elements rather than vacuum transfer elements.

As shown in FIG. 12, the foregoing cam guided, radially movable, can support arrangement of the first transfer conveyor 427 may lead into a second conveyor 470 that differs from the second conveyor 102 in FIG. 9, in that the conveyor 470 has respective shaped magnetic pathways 479 and 480, which may be substituted for suction holding when steel or ferrous cans are to be held to the second conveyor. The magnetic pathways have the same extent along the can pathways as the air suction applied to the second conveyor, as shown for the second embodiment in FIGS. 9–11.

Correspondingly, the air suction supplied by the belt 103 in the embodiment of FIGS. 9–11 may be replaced by respective magnetic pathways on the belt 483.

FIG. 12 shows schematically an arrangement of magnetic material disposed on the second transfer conveyor 470 and the belt 483 which could substitute for the suction holding of ferrous cans. Magnetic material can be used on only one of the second conveyor 470, and/or the belt 483 but need not be used on both of them and need not be used over the entirety of their conveyance paths. A substitute magnetic material arrangement for the embodiment shown in FIG. 9 is illustrated in FIG. 12. The magnetic material on both the second conveyor 470 and the belt 483 is in strips shaped to correspond to the suction pathways 151 and 152 and at belt 103 described above for FIG. 9. The magnetic material remains stationary and is supported on the frame of the apparatus, near enough to the rotating conveyor wheel and/or belt and behind their can engaging surfaces as to draw cans against the wheels and the belt.

On the second transfer conveyor 470, the respective magnet strips 479 and 480 for the outer track 151 and the inner track 152, respectively, would start at or just before the transfer points, 497 at can position 436 and 498 at can position 416, where the tangents of the paths of the cans on the first and second wheels overlap and would continue clockwise around the wheel 102, to the transfer points 482 and 484 where the transfer to the belt 483 takes place. Similarly, the belt has magnetic elements 485 and 486 behind it to attract the cans, and those magnetic elements begin at or just before the transfer points at 482, 484 and continue along the belt.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for conveying containers comprising:

first and second continuous motion transfer conveyors, said first and second conveyors being rotatable about respective generally parallel and laterally spaced first and second axes, said conveyors being so sized and their axes being so placed that radially outer portions of the first and second conveyors overlap in axially spaced relationship as said conveyors rotate past each other about their respective axes;

the first and second conveyors having respective surfaces in opposed relationship to each other in the region where the first and second conveyors overlap;

a continuous motion mandrel carrier rotatable about a third axis spaced from the first axis, the first and third axes being so positioned and the mandrel carrier and the first conveyor being of such shape and size and so placed that containers are transferred from the mandrel carrier onto a single circular path on the surface of the first conveyor;

a first mechanism associated with said first conveyor that is operable to apply an attractive force to hold containers transferred from the mandrel carrier to the circular-path on the surface of the first conveyor;

the surface of the second conveyor including concentric first and second tracks formed around the second axis;

the circular path on the surface of the first conveyor, the first and second tracks on the second conveyor being so located that the circular path is tangent only to the first track on the second conveyor as the first and second conveyors rotate;

a plurality of first container supports positioned to receive alternating ones of the containers transferred to the circular path on the first conveyor from the mandrel carrier, whereby the containers not received by the plurality of first container supports constitute a first plurality of containers transferred from the mandrel carrier, and the containers received by the plurality of first container supports constitute a second plurality of containers transferred from the mandrel carrier;

each of said first container supports being operable to move the container supported thereby from the circular path along a second path on the surface of the first conveyor which becomes tangent to the second track on the surface of the second conveyor as the first and second conveyors rotate;

the first conveyor being operative:

to discontinue the attractive force applied by the first mechanism to each of said first plurality of containers at substantially the time they reach respective points of tangency with the first track on the second conveyor, thereby to release said first plurality of containers onto said first track; and to discontinue the attractive force applied by the first mechanism to each of said second plurality of containers at substantially the time they reach respective points of tangency with the second track on the second conveyor, thereby to release said second plurality of containers onto said second track;

a second mechanism associated with said second conveyor that is operable to apply attractive forces to hold containers transferred onto the first and second tracks on the second conveyor from the first conveyor; and a continuous motion belt conveyor including a flight section movable to convey containers away from the second conveyor, the flight section being positioned to receive containers from the second conveyor at a location downstream in the rotation of the second conveyor from the region where the first and second conveyors overlap, and so positioned that the first and second plurality of containers are transferred onto the belt conveyor in two transversely spaced parallel lines.

2. Apparatus for conveying containers as set forth in claim 1, wherein said belt conveyor also includes a second flight section that is downstream of said first flight section and moves forward away from said second transfer conveyor.

3. Apparatus for conveying containers as set forth in claim 2 in which said first flight section is supported to move upward while receiving containers from said second conveyor.

4. Apparatus for conveying containers as set forth in claim 1, wherein:

said second mechanism includes a stationary low pressure manifold having an open side facing forward and a plate-like member defining said surface;

said plate-like member is rotatable continuously about said second axis as a center and is operatively positioned in front of said member to cover said open side; and said plate-like member has a plurality of apertures extending therethrough and positioned to communicate with said manifold as said plate-like member rotates, whereby lowered pressure within said manifold generates said attracting force applied by said first mechanism.

5. Apparatus for conveying containers as set forth in claim 4, wherein the containers being conveyed are oriented such that the closed ends of the containers are forward of the open ends thereof while the containers are at first and second transfer zones respectively between said mandrel carrier and said first transfer conveyor, and between said first transfer conveyor and said transfer conveyor and at a loading zone between said second transfer conveyor and said belt conveyor;

at said second transfer zone the open ends of the containers are in operative engagement with the surface of the second transfer conveyor; and at said first transfer zone said closed ends of the second plurality of containers are in operative engagement with said container supports, and at said loading zone said closed ends are in operative engagement with said flight section.

6. Apparatus for conveying containers as set forth in claim 1, wherein the containers being conveyed are oriented such that the closed ends of the containers are forward of the open ends thereof while the containers are at first and second transfer zones respectively between said mandrel carrier and said first transfer conveyor, and between said first transfer conveyor and said transfer conveyor and at a loading zone between said second transfer conveyor and said belt conveyor;

at said second transfer zone the open ends of the containers are in operative engagement with the surface of the second transfer conveyor; and at said first transfer zone said closed ends of the second plurality of containers are in operative engagement with said container supports, and at said loading zone said closed ends are in operative engagement with said flight section.

7. Apparatus for conveying containers as set forth in claim 1, wherein the surface of said second transfer conveyor is a generally planar surface.

8. Apparatus for conveying containers as set forth in claim 1, wherein:

the first and second tracks on the surface of said second transfer conveyor are comprised of grooves extending rearward into said surface and surrounding said second axis, said grooves being defined by spaced first and second side boundary walls and a rear boundary wall;

each of said containers has a transverse cross-sectional dimension that is substantially greater than spacing between said side boundary walls; and said first and second transfer conveyors are operatively positioned so containers that are received by said second transfer conveyor extend across both of said side boundary walls.

9. Apparatus for conveying containers as set forth in claim 8, wherein said second mechanism is comprised of:

a plurality of spaced apertures disposed in the rear boundary walls of said grooves; and a source of suction operatively connected to said apertures.

10. Apparatus for conveying containers as set forth in claim 9, wherein said transverse cross-sectional dimension is substantially greater than the spacing between adjacent apertures in each of said tracks.

11. Apparatus for conveying containers as set forth in claim 10, in which said transverse cross-sectional dimension is at least equal to generally two times said spacing between adjacent apertures in each of said tracks.

12. Apparatus for conveying containers as set forth in claim 1, further comprising magnetic material at the flight section of the belt conveyor to magnetically transfer containers to the belt conveyor from the second conveyor and to magnetically hold the containers to the belt conveyor.

13. Apparatus for conveying containers as set forth in claim 1, wherein said first track on the surface of the second conveyor is located radially inwardly of said second track, and said first and second pluralities of containers are transferred respectively to said first and second tracks on the surface of the second conveyor.

14. Apparatus for conveying containers as set forth in claim 1, wherein said second path on the surface of the said first conveyor begins at said circular path and ends at a position that is radially inward of said circular path, the second plurality of containers thereby being deposited on the radially outer of the concentric first and second tracks.

15. Apparatus for conveying containers as set forth in claim 14, further comprising:

a cam on the first transfer conveyor and having a path passing around the first axis;

a respective cam follower on each of the supports for the second plurality of containers, each cam follower being in engagement with and following the cam on the first conveyor;

the cam being shaped so that when the cam followers follow the cam path, the second plurality of containers follow the second path on the surface of the first transfer conveyor.

16. Apparatus for conveying containers as set forth in claim 15, wherein the first and second tracks comprise respective grooves in the surface of the second transfer conveyor in which suction is applied by the second mechanisms so that the containers are transferred to the tracks of the second conveyor by and are held there by suction.

17. Apparatus for conveying containers as set forth in claim 15, wherein:

the first and second tracks of the second transfer conveyor comprise respective grooves in the surface thereof, and the second mechanism includes magnetic material located in the tracks to magnetically hold the containers to the second conveyor.

18. Apparatus for conveying containers as set forth in claim 1, further comprising:

a cam on the first transfer conveyor and having a path passing around the first axis;

a respective cam follower on each of the supports for the second plurality of containers, each cam follower being in engagement with and following the cam on the first conveyor;

the cam being shaped so that when the cam followers follow the cam path, the second plurality of containers follow the second path on the surface of the first transfer conveyor.

19. Apparatus for conveying containers as set forth in claim 1, wherein the first and second tracks comprise respective grooves in the surface of the second transfer conveyor in which suction is applied by the second mechanisms so that the containers are transferred to the tracks of the second conveyor by and are held there by suction.

20. Apparatus for conveying containers as set forth in claim 1, further including a plurality of container supports for said first plurality of containers; and wherein:

all of said container supports are disposed in said circular path as they pass through a first transfer zone in which containers are transferred from said mandrels to said first transfer conveyor;

the spacing between adjacent ones of said mandrels is substantially greater in said first transfer zone than the spacing between adjacent ones of said container supports; and the linear speed of said mandrels in said first transfer zone is substantially greater than the linear speed of said container supports.

21. Apparatus for conveying containers as set forth in claim 1, wherein the attractive forces applied by the first and second mechanisms respectively to the surfaces of the first and second transfer conveyors are suction forces.

22. Apparatus for conveying containers as set forth in claim 21, further comprising a third mechanism operative to apply suction to the flight section of the belt conveyor to hold containers thereon.

23. Apparatus for conveying containers as set forth in claim 1, further comprising a third mechanism operative to apply an attractive force to the flight section of the belt conveyor to hold containers thereon.

24. Apparatus for conveying containers as set forth in claim 1, further comprising a third mechanism operative to apply a suction force to the flight section of the belt conveyor to hold containers thereon.

25. Apparatus for conveying containers as set forth in claim 1, further comprising a third mechanism operative to apply a magnetic force to the flight section of the belt conveyor to hold containers thereon.

26. Apparatus for conveying containers comprising:

first and second rotating disk conveyors disposed in partially overlapping relationship, the first and second disks having respective surfaces which are axially spaced and in opposed relationship in the region where the rotating disks overlap;

a mandrel carrier that cooperates with the first conveyor to transfer containers from mandrels thereon to a single circular path on the surface of the first disk;

the surface of the second disk including concentric first-hand second tracks formed thereon;

the circular path and the first and second tracks being so located that the circular path is tangent only to the first track as the first and second disks rotate;

a plurality of first container supports positioned to receive alternate containers transferred to the first disk from the mandrel carrier, a first mechanism that is operable to apply an attractive force to transfer containers from the mandrel carrier and to retain said transferred containers on said first disk;

each of said first container supports being operable to move the container supported thereby from the circular path along a second path on the surface of the first disk which becomes substantially tangent to the second track as the first and second disks rotate;

the first conveyor being operative:

to release each of containers not being held by said plurality of first container supports at substantially the time they reach respective points of tangency with the first track on the second disk; and to release each of the containers being held by said plurality of first container supports at substantially the time they reach respective points of tangency with the second track on the second disk;

a second mechanism that is operable to apply attractive forces to transfer containers released from the first disk and to retain said containers on the first and second tracks; and a continuous motion belt conveyor that cooperates with the second disk to transfer containers onto the belt conveyor in two transversely spaced parallel lines.

27. Apparatus for conveying containers as set forth in claim 26, wherein said first track on the surface of the second conveyor is located radially inwardly of said second track, and said containers carried by said plurality of first container supports are transferred to said second track on the surface of the second conveyor.

28. Apparatus for conveying containers as set forth in claim 26, wherein said second path on the surface of the said first conveyor begins at said circular path and ends at a position that is radially inward of said circular path, the containers carried by said plurality of first container supports thereby being deposited on the radially outer of the concentric first and second tracks.

29. Apparatus for conveying containers as set forth in claim 28, further comprising:

a cam on the first conveyor and having a path passing around the axis of rotation thereof;

a respective cam follower on each of the first container supports, each cam follower being in engagement with and following the cam on the first conveyor;

the cam being shaped so that when the cam followers follow the cam path, the containers supported by a plurality of first container supports follow the second path on the surface of the first transfer conveyor.

30. Apparatus for conveying containers as set forth in claim 26, further comprising:

a cam on the first conveyor and having a path passing around the first axis;

a respective cam follower for each of the containers not being held by said first container supports, each cam follower being in engagement with and following the cam on the first conveyor;

the cam being shaped so that when the cam followers follow the cam path, the second plurality of containers follow the second path on the surface of the first transfer conveyor.

31. Apparatus for conveying containers as set forth in claim 26, further including a plurality of second container supports for supporting the containers transferred to said first disk which are not supported by the first container supports; and wherein:

all of said container supports are disposed in said circular path as they pass through a first transfer zone in which containers are transferred from said mandrels to said first disk;

the spacing between adjacent ones of said mandrels is substantially greater in said first transfer zone than the spacing between adjacent ones of said container supports; and the linear speed of said mandrels in said first transfer zone is substantially greater than the linear speed of said container supports.

32. Apparatus for conveying containers as set forth in claim 26, further including a plurality of second container supports for supporting the containers transferred to said first disk which are not supported by the first container supports, said plurality of second container supports being operative to carry the containers supported thereby along said circular path to the point at which the paths of said containers are substantially tangent to said first track and thereupon, to release said containers.

* * * * *